United States Patent [19]

DeLoach

[11] Patent Number: 4,857,184
[45] Date of Patent: Aug. 15, 1989

[54] SELF-CONTAINED WATER TREATMENT SYSTEM AND ENCLOSURE

[76] Inventor: Anthony DeLoach, 1631 Jewel Dr., Sarasota, Fla. 34240

[21] Appl. No.: 241,841

[22] Filed: Sep. 7, 1988

[51] Int. Cl.$^4$ .............................................. B01D 13/00
[52] U.S. Cl. .................................... 210/128; 210/170; 210/241; 210/321.6; 210/416.3; 210/408; 210/472; 210/232
[58] Field of Search ................... 210/170, 321.6, 416.3, 210/232, 241, 128, 472, 408

[56] References Cited

U.S. PATENT DOCUMENTS

| | | | |
|---|---|---|---|
| 3,394,812 | 7/1968 | Cohen et al. | 210/241 |
| 3,585,130 | 6/1971 | Gregory | 210/266 |
| 4,134,833 | 1/1979 | McCormick | 210/121 |
| 4,196,081 | 4/1980 | Pavia | 210/284 |
| 4,383,920 | 5/1983 | Muller et al. | 210/241 |
| 4,695,375 | 9/1987 | Tyler | 210/321.6 |
| 4,773,991 | 9/1988 | Aid | 210/321.6 |
| 4,784,763 | 11/1988 | Hambleton et al. | 210/416.3 |

Primary Examiner—Richard V. Fisher
Assistant Examiner—Cynthia L. Nessler
Attorney, Agent, or Firm—Charles J. Prescott

[57] ABSTRACT

A self contained water treatment system and enclosure for a water treatment system. The water treatment includes an enclosure having a removable lid and a base. The base includes a bottom and side walls forming an upper opening structured to sealably receive the lid. The base also includes a partition which sealably engages along its upper margin against the lid. The partition forms a first and second compartment, the first compartment being water tight for receiving water. The second compartment, having a removable side wall panel, houses the water treatment system operably connected therein. A well water source is connectable to and received through an inlet in one side wall into the water treatment system and aeration-sprayed into the first compartment to remove gases from the well water. Purified and degasified water is removed from the first compartment by the water treatment system and delivered out an outlet tube in one side wall connectable to a dwelling water inlet line. Apertures are provided in at least one side wall to vent gases from the first compartment.

17 Claims, 1 Drawing Sheet

SELF-CONTAINED WATER TREATMENT SYSTEM AND ENCLOSURE

BACKGROUND OF THE INVENTION

The present invention relates generally to water treatment and purification systems, and more particularly to a self contained water treatment system for dwellings.

Water treatment systems, and components thereof, are widely used and well known for use in conjunction with single family dwellings. Where well water is available, various arrangements of pumps and filters, including reverse osmosis purifiers, are utilized to prepare and store the water for delivery into the dwelling. Additionally well known are degasifiers, also sometimes referred to as "aerators", which spray well water into a chamber beneath a spray nozzle so as to release trapped gases from the well water.

In order to install these conventional water treatment systems, generally a contractor must prepare a foundation, install the equipment thereon, plumbing and interconnecting the components to themselves and from the well water supply and into the dwelling. Electrical power input and interconnection to the water system is also required. Thereafter, some form of shelter may also be constructed around the equipment to protect same from the elements. Where a degasifier is also desired, a separate foundation and interconnecting plumbing is also required.

This conventional installation is expensive and time consuming and may result in inconsistencies and imperfections resulting from the on-site assembly and interconnection of these components.

The present invention provides a ready-for-delivery water treatment system operably connected within an enclosure which may itself include a water degasifying or aerating and collecting compartment. This self-contained system is structured to be deployed on flat ground ready for interconnection to a source of well water, to the dwelling water main line, and electrical power supply line. Separately, an enclosure in accordance with the present invention may be provided deployable in the same fashion ready to receive the separate choice of water treatment systems connectable therein.

BRIEF SUMMARY OF THE INVENTION

This invention is directed to a self contained water treatment system and enclosure for a water treatment system. The water treatment system includes an enclosure having a removable lid and a base. The base includes a bottom and side walls forming an upper opening structured to sealably receive the lid. The base also includes a partition which sealably engages along its upper margin against the lid. The partition forms a first and second compartment, the first compartment being water tight for receiving water. The second compartment, having a removable side wall panel, houses the water treatment system operably connected therein. A well water source is connectable to and received through an inlet in one side wall into the water treatment system and aeration-sprayed into the first compartment to remove gases from the well water. Purified and degasified water is removed from the first compartment by the water treatment system and delivered out an outlet tube in one side wall connectable to a dwelling water inlet line. Apertures are provided in at least one side wall to vent gases from the first compartment.

It is therefore an object of this invention to provide a water treatment system which is self contained and deployable atop flat ground requiring only interconnection to a supply of well water, a dwelling water main and electric service lines.

It is another object of this invention to provide a complete self contained water treatment system which includes a degasifying water storage compartment.

It is yet another object of this invention to provide a water treatment system enclosure which is structured to receive water treatment equipment connectable therein and readily connectable between a source of well water and the main water line into a dwelling.

In accordance with these and other objects which will become apparent hereinafter, the instant invention will now be described with reference to the accompanying drawings in which:

DETAILED DESCRIPTION OF THE INVENTION

Figure 1:
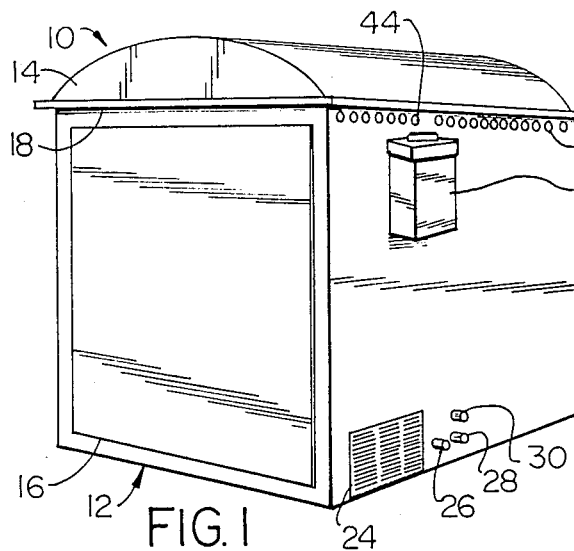
FIG. 1 is a right front perspective view of the preferred embodiment of the invention.

Referring now to the drawings, the preferred embodiment of the invention is shown generally at numeral 10. The invention 10 includes an enclosure 12 and crown-shaped lid 14. The enclosure 12 includes a bottom and continuous upwardly extending side walls which are integrally fabricated of molded fiberglass. Likewise, the lid 14 is fabricated of molded fiberglass for appearance and durability.

The lid 14 is adapted to sealably engage against an elastomeric gasket 38 which is adhered atop flanges 36 outwardly extending from the upper margins of the side walls as shown. Disposed transversely between two opposing side walls is a rigidly interconnected fiberglass partition 50 which divides the enclosure 12 into two compartments, 34 and 64. Compartment 34 is adapted to be water tight and structured to laterally support a quantity of water to be placed therein. Compartment 64 is adapted to supportively receive and protectively house the water treatment system which will be herebelow described.

Partition 50 upwardly extends having elastomeric material contained along its upper edge so as to matably and sealably engage against the inner surface of lid 14.

Figure 2:
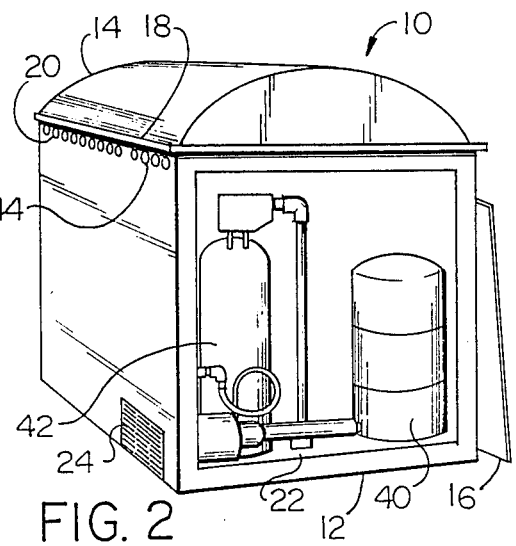
FIG. 2 is a left front perspective view of FIG. 1 with the side panel cover removed.
Figure 3:
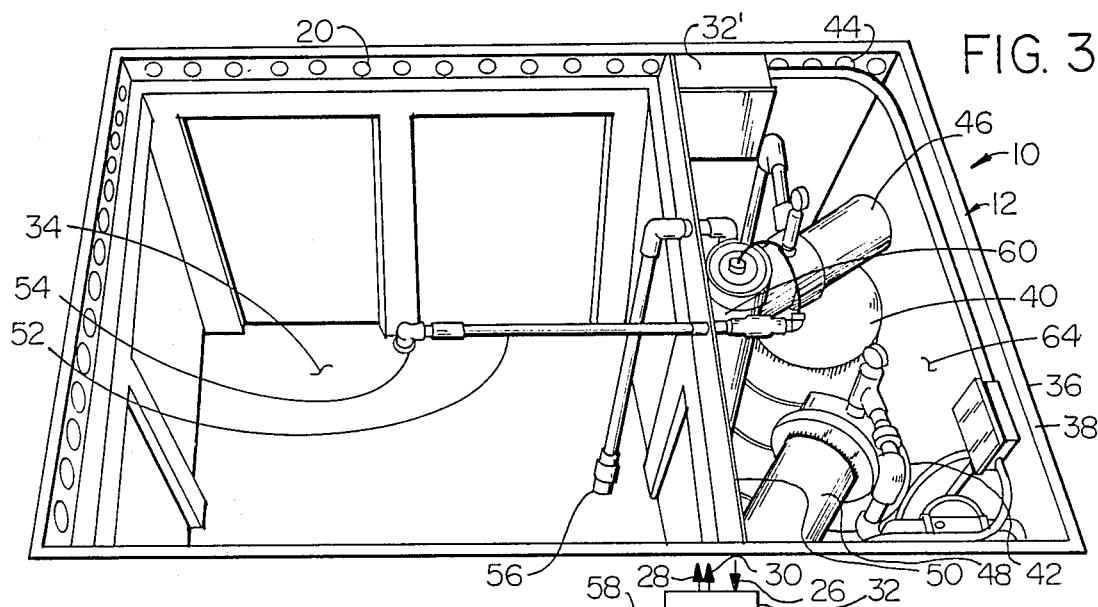
FIG. 3 is a top left side perspective view of FIG. 1 with the lid removed.

The side wall panel 16 adjacent the water treatment system compartment 64 is removable as best seen in FIG. 2 so as to facilitate servicing of the water treatment system contained therein.

Connected to partition 50 is a horizontally disposed fluid conduit 52 having a spray nozzle 54 disposed in its end and positioned centrally above compartment 34. The opposite end of tube 52 is interconnected at an intermediate point within the water treatment system at a point which will be herebelow described.

Also connected to partition 50 is a downwardly extending water pickup tube 56 which is again interconnectable at an appropriate point intermediate in the water treatment system.

Figure 4:
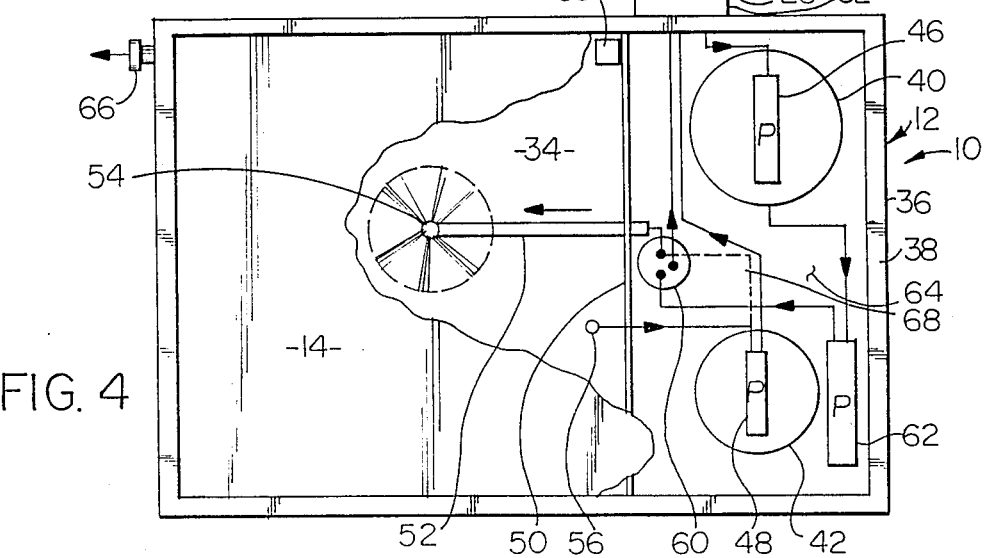
FIG. 4 is a broken top plan schematic view of FIG. 3.

Referring particularly to FIG. 4, the preferred embodiment of the water treatment system 10 includes a lower pressure pump 46 having its inlet connected to inlet tube 26 which, itself is interconnectable to a supply of well water. The output of pump 46 is directed into accumulator tank 40 for storage. When required, high pressure pump 62 accepts well water from accumulator tank 40 and pressurizes same for discharge into reverse osmosis (RO) element 60. The output of the RO element 60 discharges the purified water into conduit 52 and out through spray nozzle 54. As the well water, which has been purified by the RO purifier, discharges from nozzle 54 in spray like fashion above compartment 34, trapped gases such as hydrogen sulfide, radon and the like are released. Trapped above the water contained in compartment 34 by the crown shape of lid 14, the gases are then self-venting out apertures 20 which are distributed through and adjacent the upper margin of the side walls forming compartment 34.

As required, pickup tube 56, which extends down toward but not to the bottom of compartment 34 transfers by house pump 48 the purified and degasified water into accumulator tank 42 which, in turn, distributes water from outlet tube 30 mounted in the side wall of the enclosure 12. Outlet tube 30 is interconnectable to the main feed or supply line for the dwelling water supply system.

Also provided in the preferred embodiment 10 is an electrical juncture 32 which facilitates interconnection of the electrical power supply lines to the appropriate circuitry of pumps 46, 48 and 62 without the need for internal disassembly of any of the water treatment system. The internal portion 32' of juncture box 32 is connected to the inner surface of a side wall and pre-wired appropriately upon the installation of the water treatment system at the point of manufacture of the system 10.

Also provided is a float switch 58 which activates the pumps 46 and 62 at such times as the water level in compartment 34 falls below a predetermined level.

Apertures 44 are also provided along and adjacent the upper margin of the side walls surrounding compartment 64 for ventilation purposes and both arrangement of apertures 20 and 44 are covered with a screen or mesh material to prevent bugs and insects from entering therethrough. To further facilitate the venting of the water treatment system compartment 64, louvers 24 are provided adjacent the bottom of each side panel of that compartment 64.

An alternate embodiment of the invention may be provided having a general external appearance similar to that with regard to the preferred embodiment 10, except deleting the entire water compartment 34 and associated lid 14. The enclosure thus ends along partition 50, itself having the same finished external appearance as the rear side wall forming the water compartment 34. Typically, in this embodiment, a similar water treatment system, including the RO unit 60 may be provided. However, in this alternate embodiment, the output of the RO unit 60 is directed into pump 48 and accumulator tank 42 as shown in the dotted conduit at 68. All other functions and operable interconnecting conduit are similar to the preferred embodiment 10.

In water treatment system arrangements where the RO purifier 60 is to discharge brine or waste water, a separate flushing conduit may be required to discharge the waste liquid. In that event, waste outlet 28 connected through the side wall of enclosure 12 is also provided to be interconnectable to a suitable conduit for disposal of the waste liquid.

Note that applicant views as equivalent the use of RO purifiers, water softening equipment or other types of filters such as carbon or potassium permangenate. The placement of these alternate filtration/purification devices within the water treatment system equipment will vary in well-known ways in accordance with function sequencing.

While the instant invention has been shown and described herein in what is conceived to be the most practical and preferred embodiment, it is recognized that departures may be made therefrom within the scope of the invention, which is therefore not to be limited to the details disclosed herein, but is to be accorded the full scope of the claims so as to embrace any and all equivalent apparatus and articles.

What is claimed is:

1. A self-contained water treatment system enclosure structured for placement atop the ground, comprising:

a base having a bottom and upwardly extending side walls forming an upper opening and having a partition upwardly extending from said base and between two opposing side walls to said opening to form a first water tight compartment and a second compartment;

a removable lid structured to sealably engage against and cover said opening, said partition extending upwardly to sealably engage against said lid;

said first compartment structured to receive and store a quantity of water;

said second compartment having a removable side wall panel and structured to supportively receive components of a means for treating water having an inlet and an outlet and connected therewithin;

an inlet tube connected through one said side wall structured for interconnection between a source of well water and the water treating means inlet;

an outlet tube connected through one said side wall structured for interconnection between a house water inlet conduit and the water treating means outlet;

a spray nozzle connected to said partition structured to be operably interconnected within the water treating means and to spray discharge water pressurized within the water treating means above the surface of the water stored in said first compartment;

a water pickup conduit connected to said partition structured to be operably interconnected within the water treating means and to convey water stored in said first compartment to a pump in the water treating means, the pump discharging water to said outlet tube; and a plurality of apertures in one said side wall adjacent its upper margin structured to allow gases released from well water discharging from said spray nozzle into said first compartment to vent outside said enclosure.

2. A water treatment system enclosure as set forth in claim 1, further comprising:

a power juncture box connected to one said side panel structured for electrical interconnection between a source of electrical power and the water treating means;

a float switch operably connected to said base and the water treating means structured for sensing water level in said first compartment and for switching on the water treating means when the water level in said first compartment drops below a predetermined level.

3. A water treatment system enclosure as set forth in claim 1, wherein:
said base and said lid are molded fiberglass.

4. A water treatment system enclosure as set forth in claim 3, further comprising:
a screen sheet covering said plurality of apertures for preventing bugs and insects from passing therethrough.

5. A water treatment system enclosure as set forth in claim 4, further comprising:
a removable drain plug in said first compartment structured for draining all water from said first compartment.

6. A water treatment system enclosure as set forth in claim 4, further comprising:
a lower vent disposed through one said side wall adjacent its lower margin structured to allow circulation of air through said second compartment.

7. A self-contained water treatment system structured for placement atop flat ground and ready to be operably connected to a source of well water and to a main water feed conduit into a dwelling, comprising:
an enclosure including a base having a bottom and upwardly extending side walls forming an upper opening and having a partition upwardly extending from said base and between two opposing side walls to said opening to form a first water tight compartment and a second compartment;
said enclosure also including a removable lid structured to sealably engage against and cover said opening, said partition extending upwardly to sealably engage against said lid;
said first compartment structured to receive and store a quantity of water;
a water treating means having an inlet and an outlet operably connected within said second compartment, said second compartment also having a removable side wall panel;
an inlet tube connected through one said side wall structured for interconnection between a source of well water and said treating means inlet;
an outlet tube connected through one said side wall structured for interconnection between a house water inlet conduit and said water treating means outlet;
a spray nozzle connected to said partition structured to be operably interconnected within said water treating means and to spray discharge water pressurized within said water treating means above the surface of the water stored in said first compartment;
a water pickup conduit connected to said partition structured to be operably interconnected within said water treating means and to convey water stored in said first compartment to a pump in said water treating means, said
pump discharging water to said outlet tube; and
a plurality of apertures in one said side wall adjacent its upper margin structured to allow gases released from well water discharging from said spray nozzle into said first compartment to vent outside said enclosure.

8. A self-contained water treatment system as set forth in claim 7, wherein:
said enclosure is molded fiberglass.

9. A self-contained water treatment system as set forth in claim 8, wherein said water treating means includes:
a first water pump operably interconnected between said inlet tube and a first accumulator tank having an inlet and an outlet structured to receive and store a quantity of well water;
a second water pump operably interconnected between said first accumulator tank outlet and a reverse osmosis water purifier having an inlet and an outlet, said second water pump structured to deliver pressurized well water from said first accumulator tank into said purifier;
said purifier outlet operably connected to said spray nozzle;
a third water pump operably interconnected between said water pickup conduit and a second accumulator tank having an inlet and an outlet structured to receive and store a quantity of water from said first compartment;
said second accumulator tank outlet operably connected to said outlet tube.

10. A self-contained water treatment system as set forth in claim 8, further comprising:
a power juncture box connected to one said side panel structured for electrical interconnection between a source of electrical power and said water treating means;
a float switch operably connected to said base and said water treating means structured for sensing water level in said first compartment and for switching on said water treatment system when the water level in said first compartment drops below a predetermined level.

11. A self-contained water treatment system as set forth in claim 8, further comprising:
a screen sheet covering said plurality of apertures for preventing bugs and insects from passing therethrough.

12. A self-contained water treatment system as set forth in claim 11, further comprising:
a removable drain plug in said first compartment structured for draining all water from said first compartment.

13. A self-contained water treatment system as set forth in claim 11, further comprising:
a lower vent disposed through one said side wall adjacent its lower margin structured to allow circulation of air through said second compartment.

14. A self-contained water treatment system structured for placement atop flat ground and ready to be operably connected to a source of well water and to a main water feed conduit into a dwelling, comprising:
an enclosure including a base having a bottom and upwardly extending side walls forming an upper opening;
said enclosure also including a removable lid structured to sealably engage against said opening;
said base having an inlet and an outlet and a removable side wall panel and protectively and supportively housing a means for treating water therein;
an inlet tube connected through one said side wall structured for interconnection between a source of well water and said water treating means inlet;
an outlet tube connected through one said side wall structured for interconnection between a house water inlet conduit and said water treating means outlet;

said water treating means including a first water pump operably interconnected between said inlet tube and a first accumulator tank having an inlet and an outlet structured to receive and store a quantity of well water;

a second water pump operably interconnected between said first accumulator tank outlet and a reverse osmosis water purifier having an inlet and an outlet, said second water pump structured to deliver pressurized well water from said first accumulator tank into said purifier;

said purifier outlet operably connected to a second accumulator tank structured to receive and store a quantity of water from said purifier; and said second accumulator tank outlet operably connected to said outlet tube.

15. A self-contained water treatment system as set forth in claim 14, wherein:

said enclosure is molded fiberglass.

16. A self-contained water treatment system as set forth in claim 14, further comprising:

a power juncture box connected to one said side panel structured for electrical interconnection between a source of electrical power and said water treatment system.

17. A self-contained water treatment system as set forth in claim 14, further comprising:

a lower vent disposed through one said side wall adjacent its lower margin structured to allow circulation of air through the interior of said enclosure.

* * * * *